Aug. 12, 1924.

G. G. BUSH 1,504,210

DRIVING AND BRAKING MECHANISM

Filed March 10, 1922

Inventor:
George G. Bush,
by
his Attorney.

Patented Aug. 12, 1924.

1,504,210

UNITED STATES PATENT OFFICE.

GEORGE G. BUSH, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

DRIVING AND BRAKING MECHANISM.

Application filed March 10, 1922. Serial No. 542,776.

*To all whom it may concern:*

Be it known that I, GEORGE G. BUSH, a citizen of the United States, residing at Bristol, county of Hartford, State of Connecticut, have invented a certain new and useful Driving and Braking Mechanism, of which the following is a full, clear, and exact description, such as will enable others skilled in the art to which it appertains to make and use the same, reference being had to the accompanying drawings, forming part of this specification.

This invention relates to driving and braking mechanism particularly adapted for use in velocipedes. My object is to provide an efficient structure whereby the velocipede or the like can be driven forwardly, be braked, or be driven backwardly, and, preferably, can also coast, as the rider may desire, the structure being such that forward driving can be effected through ordinary forward pedalling, backward driving through ordinary backward pedalling, and braking can be effected through the ordinary and customary slight backward rocking of the pedals, while simply holding the pedals stationary permits coasting. To these ends, and also to improve generally upon devices of the character indicated, my invention consists in the various matters hereinafter described and claimed.

Figure 1:
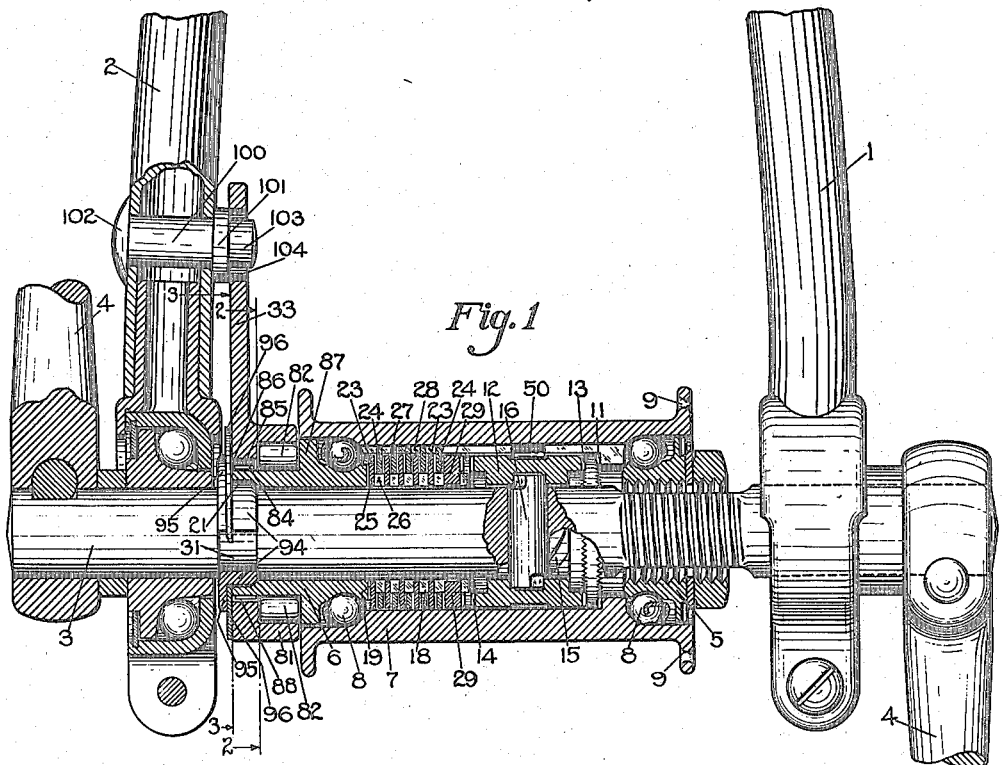
Figure 2:
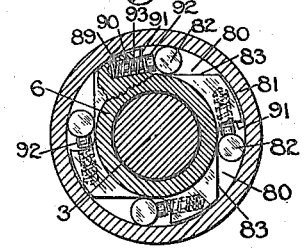
Figure 4:
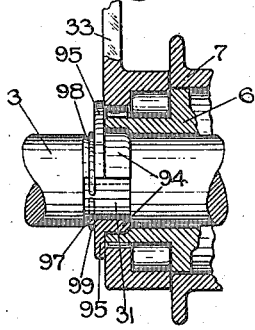
Figure 3:
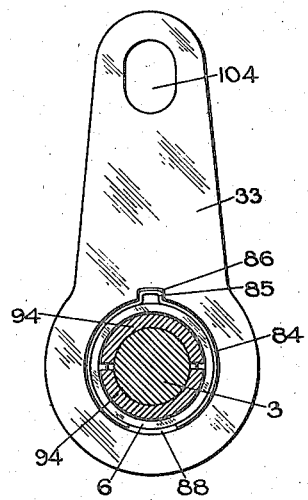

In the accompanying drawings, Figure 1 is an elevation, partly in vertical section, with some of the parts broken away; Figures 2 and 3 are end elevations, partly in section, on about the lines 2—2 and 3—3, respectively, of Figure 1, looking in the direction of the arrows; and Figure 4 is a fragmentary view, partly in section, illustrating a modification of one of the details.

My invention is herein illustrated as applied to a form of coaster brake mechanism previously known and heretofore employed for velocipedes for children. Referring first to parts of this earlier form here shown, 1 and 2 indicate the side bars of the front fork of a child's velocipede, 3 indicates the customary driver or crank shaft rotatably supported in those bars and having the pedal cranks 4 rigidly attached at its ends in the usual way, 5 indicates the bearing cone screwed upon said shaft, 6 the second cone, or brake anchor, loosely surrounding the shaft, and 7 the hub shell rotatably supported upon these cones through the balls 8 and adapted to have the spokes of the usual front wheel of a child's velocipede secured to it at the spoke-holes 9. The brake shown comprises alternating annular clutch discs 23 and 24, the discs 23 having radially inwardly extending fingers 25 which are loosely received in the longitudinal slots 26 of the sleeve 18 which extends laterally inwardly from the cone 6, and the discs 24 having radially outwardly extending fingers 27 loosely received in longitudinal grooves 28 of the hub 7, the outermost disc of the series being adapted to abut against the shoulder 19 of the cone 6 and the innermost disc 29 being somewhat thickened and serving as a brake actuator which can force the discs into frictional engagement with each other. The brake arm or fastener 33 is non-rotatably connected to the side bar 2 and has connection with the brake anchor 6 to prevent undesired rotation of the latter. The laterally shiftable clutch connector is indicated at 12, and 16 indicates the driving pin which extends through the shaft 3 and has its ends received in the thread-slots 15 of the connector 12, 50 indicating the retarder or lag spring.

Thus, as is well understood, when the pedals 4 are driven forwardly the connector 12 is shifted to the right and, through the coooperating teeth 11 (upon the hub) and 13 (upon the connector), makes clutching engagement with the hub 7, with the result that the velocipede is driven by the continued rotation of the pedals; when the pedals are held stationary the velocipede coasts, the connector 12 shifting out of driving engagement with the hub; and upon a slight backward rocking of the pedals the connector 12 shifts to the left and its teeth 14 engage the corresponding teeth of the brake actuator disc 29, with the result that, assuming that the arm 33 holds the brake anchor 6 against rotation, continued such backward pressure on the pedals forces the discs 23 and 24 into such frictional engagement with each other that the wheel is braked.

According to my invention the clutched brake elements are enabled to freely move backwardly, but means are provided for preventing forward rotation of such brake elements not carried by the hub. In the present embodiment, inclined roller-seats 80 are provided in the periphery of the outer portion of the brake anchor 6, and upon the inner side of the brake arm or fastener 33 I provide an annular drum or flange 81 surrounding those seats, while clutch rollers or pawls 82 are inserted in the seats, whereby the brake anchor and its carried clutch discs 23 can rotate backwardly but cannot rotate forwardly, because upon any such forward rotation the upwardly inclined surfaces 83 of the roller-seats 80 force the rollers into contact with the drum 81 and the brake anchor is thereby locked against forward rotation. Also, a lag-spring or retarder 84 is preferably provided between the brake anchor 6 and the brake arm 33, this spring being conveniently a split ring of spring metal with a central hump or projection 85 received in a recess 86 in the brake arm or fastener and having its finger-like portions at the sides of this hump surrounding and yieldably pressing against the periphery of the outer end of the brake anchor sleeve 6.

Thus, forward driving and coasting are effected as usual, and upon turning the pedals backwardly the connector 12 presses toward the left and squeezes the clutch discs 23 and 24 against each other as heretofore. But, as my present structure leaves the disc-holding brake anchor 6 free to rotate backwardly, if the backward turning of the pedals occurs when there is nothing to brake (as when the velocipede is standing at rest) the continued backward rotation of the pedals causes the pin 16 to rotate the connector 12 backwardly and this carries with it the brake actuator 29, its associated brake discs 23, the discs 24 (now clamped to the discs 23), and the hub 7 which, as previously mentioned, is connected to the discs 24, so that the discs 23 and 24 simply act as a clutch and the backward rotation of the pedals drives the velocipede backwardly. Of course, upon resumption of forward pedalling the velocipede will be driven forwardly in the usual way. Should the backward pedalling occur, however, while the velocipede is traveling forwardly under momentum and there is, therefore, something to be braked, when the shifting of the connector to the left has effected frictional engagement between the discs 23 and 24 as above described the one-way clutch having the rolls 82 prevents any turning of the discs 23 in the forward direction (that in which the velocipede wheel is rotating under its momentum), so that the discs brake the wheel exactly as they did in the prior structures having the brake anchor 6 permanently rigidly connected to the fastener or brake arm 33, this braking being thus effected through an anchored brake and the braking strain being thus taken up by the frame of the velocipede and not by the feet of the rider.

The retarder or lag spring 84 insures against the possibility of travel of the pedals backwardly through any considerable arc before effective contact is set up between the discs 23 and 24. That is to say, the friction between that retarder and the brake anchor 6 is sufficient to resist backward turning force of the connector 12 until the lateral force exerted by that connector has caused frictional engagement between the discs 23 and 24. Of course, after this gripping between those discs is once established the forward pull of the discs 24 (carried by the rotating hub) itself acts against the pedal force tending to rotate the connector 12 backwardly, so that the backward pressure on the pedals is, through the threads 15, translated into lateral pressure to squeeze the discs 23 and 24 more tightly together and thus brake the wheel.

Preferably, an annular web 87 of the brake anchor cone is left at the inner side of the roller seats 80, and this web fits fairly closely within the end of the hub 7 and thus excludes dirt from the interior of the hub. Also, the roller-receiving space within the drum 81 opens upon the inner side of the drum so that this drum and its attached brake arm 33 can be readily slipped into place over the rollers. The opening 86 which receives the hump of the lag-spring or retarder 84 is conveniently formed by merely slotting the brake arm from its outer side to the space within its drum, this slot opening upon the central opening 88 which receives the projecting outer end of the brake anchor 6.

I also prefer to provide springs 89 which tend to force the clutch rollers 82 into the higher portions of their seats, these springs being conveniently seated in pockets 90 formed in the brake anchor 6 and opening upon what may be termed the forward walls 91 of the roller seats; and I also prefer to place in each spiral spring 89 a poppet having a flat head 92 which bears against the periphery of its associated roller and also having an elongated stem 93 which enters the appropriate pocket 90 and prevents the projecting portion of the spring from bending and thus getting out of shape and losing its effectiveness.

To form an abutment for the cone 6 and thus prevent its outward movement with respect to the shaft 3 I provide substantially semi-circular blocks 94 which are received in a groove 31 formed around the shaft 3, and each of these blocks has at its outer end a radially outwardly extending flange 95 which is upon the outer side of the brake anchor 6 and the fastener arm 33, the brake anchor having in its end a central recess 21 which receives the inner portions of the abutment blocks 94 and thus holds them in place, while the abutment of the cone 6 against the blocks 94 serves to prevent lateral movement of the cone. I prefer to interpose an annular washer 96 between, on the one hand, the flanges 95, and, on the other hand, the brake anchor 33 and the outer end of the cone 6, and this washer not only snugly receives the blocks 94 in its central opening and thus holds the blocks about the shaft 3, but also extends over and closes the opening which receives the hump of the lag-spring and also the space occupied by that spring between the cone 6 and the arm 33.

If desired, the blocks 94 can, as shown in Figure 4, have an extension 97 at their outer sides and of an external diameter not greater than that of the shaft 3, an inwardly and downwardly sloping seat 98 being formed in the periphery of these extensions and adapted to receive a split, resilient wire ring 99 which holds the abutment blocks firmly upon the shaft 3 and thus guards against all possibility of rattling. In assembling the parts the blocks 94 are placed in the groove 31 while the cone 6 is on the axle but at a point further inwardly than permits it to engage the blocks. If the retaining ring 99 is to be employed it can then be very easily slipped over the end of the shaft 3 and then merely slid along the shaft until it slips onto the blocks and snugly engages in the inclined seat 98, whereupon the cone 6 can be slid outwardly along the shaft until it overlaps and abuts against the shoes 94, as illustrated. Of course, when using the retaining spring 99 the washer 96 can, if preferred, be omitted for such retaining purpose.

As a preferable means of connecting the brake arm or fastener 33 to the frame, a bolt 100, having a head 101, extends through the appropriate frame bar 2, and is secured therein, as by riveting its end as at 102, and a stud 103 extending laterally inwardly from that bolt is received in an elongated slot 104 in the fastener arm 33. This holds the arm 33 against rotary movement and yet enables easy assembling and permits the arm to find its proper position without danger of cramping the rollers 82 or otherwise binding the parts of the mechanism.

Thus, I provide a mechanism of practical and efficient construction in which, although an integral form of axle or crank shaft is employed and the pedals are rigidly attached to their shaft in the usual way, ordinary forward propulsion of the pedals will drive the velocipede forwardly, merely holding the feet still in the ordinary way will permit the velocipede to coast, simply rotating the pedals backwardly in the ordinary manner will propel the velocipede backwardly, and the slight backward turning of the pedals, usual and well known in coaster brake constructions, will effect braking when the velocipede is moving forwardly.

I claim:

1. In a driving and braking mechanism, a driver, a driven wheel, and means whereby through mere backward movement of said driver said wheel can be driven backwardly and can be braked; substantnally as described.

2. In a driving and braking mechanism, a driver comprising a rigid shaft having pedals rigidly connected therewith, a driven wheel, and means whereby through backward movement of said driver said wheel can be driven backwardly and can be braked; substantially as described.

3. In a driving and braking mechanism, a driver, a driven wheel rotatable independently of said driver, and means whereby through mere backward movement of said driver said wheel can be driven backwardly and can be braked; substantnally as described.

4. In a driving and braking mechanism, a driver, a driven wheel, means whereby said wheel is driven forwardly upon movement of said driver in one direction, and means whereby upon mere movement of said driver in another direction said wheel can be driven backwardly and can be braked; substantially as described.

5. In a driving and braking mechanism, a driver, a wheel rotatable independently thereof, means whereby said wheel can be driven forwardly upon movement of said driver in one direction but can rotate independently of said driver, and means whereby upon mere movement of said driver in the opposite direction said wheel can be driven backwardly and can be braked; substantially as described.

6. In a driving and braking mechanism, a driver, a driven wheel, a brake, means for anchoring said brake, and means whereby upon backward movement of said driver said wheel can be driven backwardly and can be braked by the anchored brake; substantially as described.

7. In a driving and braking mechanism, a driver, a driven wheel which can rotate independently thereof, a brake, means for anchoring said brake, and means whereby upon backward movement of said driver said wheel can be driven backwardly and can be braked by the anchored brake; substantially as described.

8. In a driving and braking mechanism, a driver, a driven wheel, a brake element adapted to cooperate with said wheel, means for operating said brake element by movement of said driver, and means for anchoring said brake element against movement in one direction but permitting it to rotate with said wheel for movement in the opposite direction; substantially as described.

9. In a driving and braking mechanism, a driver, a driven wheel, a brake element adapted to cooperate with said wheel, means for operating said brake element by movement of said driver, means for anchoring said brake element against movement in one direction but permitting it to rotate with said wheel for movement in the opposite direction, and means for retarding such rotary movement of said brake element; substantially as described.

10. In a driving and braking mechanism, a driver, a driven wheel, a clutch member movable into and out of clutching connection with said wheel and rotatable backwardly, means for holding said clutch member against forward rotation, and means whereby said driver can move said clutch member into said clutching connection and can rotate said clutch member backwardly; substantially as described.

11. In a driving and braking mechanism, a driver, a driven wheel rotatable independently thereof, a clutch member movable into and out of clutching connection with said wheel and rotatable backwardly, means for holding said clutch member against forward rotation, and means whereby upon backward movement of said driver force is exerted upon said clutch member tending to move the same into said clutching connection and also tending to rotate said clutch member backwardly; substantially as described.

12. In a driving and braking mechanism, a driver, a driven wheel rotatable independently thereof, a clutch member movable into and out of clutching connection with said wheel and rotatable backwardly, means for holding said clutch member against forward rotation, means whereby upon backward movement of said driver force is exerted upon said clutch member tending to move the same into said clutching connection and also tending to rotate said clutch member backwardly, and means for yieldably resisting said backwardly tending force; substantially as described.

13. In a driving and braking mechanism, a frame, a driver, a driven wheel, a brake element adapted to cooperate with said wheel, means for operating said brake element by movement of said driver, and a one-way clutch between said brake element and said frame; substantially as described.

14. In a driving and braking mechanism, a frame, a driver, a driven wheel, a brake anchor, a brake element non-rotatably carried by said brake anchor but movable thereon into and out of position to cooperate with said wheel, a one-way clutch connection between said brake anchor and said frame, and means for operating said brake element and said brake anchor by movement of said driver; substantially as described.

15. In a driving and braking mechanism, a frame, a driver, a driven wheel, a brake anchor, a brake element non-rotatably carried by said brake anchor but movable thereon into and out of position to cooperate with said wheel, a one-way clutch connection between said brake anchor and said frame, means for operating said brake element and said brake anchor by movement of said driver, and means for retarding such operative movement of said brake anchor; substantially as described.

16. In a driving and braking mechanism, a frame, a driver, a driven wheel, a brake anchor, a brake element non-rotatably carried by said brake anchor but movable thereon into and out of position to cooperate with said wheel, a one-way clutch connection between said brake anchor and said frame, means for operating said brake element and said brake anchor by movement of said driver, and a friction element between said brake anchor and some part of the mechanism not movable therewith; substantially as described.

17. In a driving and braking mechanism, a frame, a driver, a driven wheel, a brake anchor, a brake element non-rotatably carried by said brake anchor but movable thereon into and out of position to cooperate with said wheel, a one-way clutch connection between said brake anchor and said frame, means for operating said brake element and said brake anchor by movement of said driver, and a friction element between said brake anchor and said frame; substantially as described.

18. In a driving and braking mechanism, a driver, a driven wheel, a clutch element movable into and out of clutching connection with said wheel, means for anchoring said clutch element against movement in one direction but permitting it to rotate with said wheel in the opposite direction, a shiftable connector between said driver and said clutch element, and means whereby movement of said driver in one direction forces said connector in the direction to effect clutching connection between said clutch and said wheel and also in said direction of rotation in which said clutch is free to rotate; substantially as described.

19. In a driving and braking mechanism, a driver, a driven wheel, a clutch element movable into and out of clutching connections with said wheel, means for anchoring said clutch element against movement in one direction but permitting it to rotate with said wheel in the opposite direction, a shiftable connector between said driver and said clutch element, and threaded operating connection between said driver and said connector; substantially as described.

20. In a driving and braking mechanism, a driver, a driven wheel, a clutch element movable into and out of clutching connection with said wheel, means for anchoring said clutch element against movement in one direction but permitting it to rotate with said wheel in the opposite direction, a shiftable connector between said driver and said clutch element, means whereby movement of said driver in one direction shifts said connector into driving connection with said wheel, and means whereby movement of said driver in the opposite direction forces said connector in the direction to effect clutching connection between said clutch and said wheel and also in said direction of rotation in which said clutch is free to rotate; substantially as described.

21. In a driving and braking mechanism, the combination with the frame, the driver, the driven wheel, and means whereby said wheel is driven upon forward movement of said driver, of a brake anchor, cooperating clutch elements respectively connected to said wheel and to said brake anchor, means whereby upon backward movement of said driver said clutch elements are caused to clutch and are subjected to backward pressure, and a one-way clutch between said brake anchor and said frame; substantially as described.

22. In a driving and braking mechanism, the combination with the frame, the driver, the driven wheel, and means whereby said wheel is driven upon forward movement of said driver, of a brake anchor, cooperating clutch elements respectively connected to said wheel and to said brake anchor, means whereby upon backward movement of said driver said clutch elements are caused to clutch and are subjected to backward pressure, a one-way clutch between said brake anchor and said frame, and a yieldable retarder for said brake anchor; substantially as described.

23. In a driving and braking mechanism, the combination with the frame, the driver, the driven wheel, and means whereby said wheel is driven upon forward movement of said driver, of a brake anchor, cooperating clutch elements respectively connected to said wheel and to said brake anchor, a connector shiftable into and out of position to operate said clutch elements, means whereby backward movement of said driver so shifts said connector and also can move said connector backwardly with said driver, and a one-way clutch between said brake anchor and said frame; substantially as described.

24. In a driving and braking mechanism, the combination with the frame, the driver, the driven wheel, and means whereby said wheel is driven upon forward movement of said driver, of a brake anchor, cooperating, laterally movable clutch discs which are slidably but non-rotatably connected respectively to said wheel and to said brake anchor, a laterally shiftable connector adapted to cooperate with said discs, means for causing backward movement of said driver to shift said connector into operative relationship to said discs and also to carry said connector with said driver in its movement, and a one-way clutch between said brake anchor and said frame; substantially as described.

25. In a driving and braking mechanism, a driver shaft, a hub about the same, an anchoring sleeve also about said shaft and with respect to which said shaft is rotatable, a clutching and braking device carried by said sleeve and cooperating with said hub, means for anchoring said sleeve against rotation in one direction but permitting it to rotate in the other, and operative connection between said shaft and said clutching and braking device; substantially as described.

26. In a driving and braking mechanism, a driver, a driven hub, a brake fastener having means for fastening it to the frame of a velocipede, a brake clutch cooperative with said hub, a one-way clutch between said brake clutch and said brake fastener, and operative connection between said brake clutch and said driver; substantially as described.

27. In a driving and braking mechanism, a driver, a driven hub, a brake fastener having means for fastening it to the frame of a velocipede, a brake clutch cooperative with said hub, a one-way clutch between said brake clutch and said brake fastener, operative connection between said brake clutch and said driver, and a retarding device between said brake clutch and said brake fastener; substantially as described.

28. In a driving and braking mechanism, a driver, a driven hub, a brake carrier, a brake clutch carried by said brake carrier and cooperative with said hub, a brake fastener adapted to be fastened to the frame of a velocipede and having a clutch drum about said brake carrier, a one-way clutch between said drum and said brake carrier, and operative connection between said driver and said brake clutch; substantially as described.

29. In a driving and braking mechanism, a driver, a driven hub, a brake carrier, a brake clutch carried by said brake carrier and cooperative with said hub, a brake fastener adapted to be fastened to the frame of a velocipede and having a clutch drum about said brake carrier, one of said last two mentioned elements having inclined surfaces, clutch pawls cooperating therewith and between said drum and said brake carrier, and operative connection between said driver and said brake clutch; substantially as described.

30. In a driving and braking mechanism, a driver, a driven hub, a brake carrier, a brake clutch carried by said brake carrier and cooperative with said hub, a brake fastener adapted to be fastened to the frame of a velocipede and having provision for holding a retarder, a retarder so held by said brake fastener and cooperating with said brake carrier, and operative connection between said driver and said brake clutch; substantially as described.

31. In a driving and braking mechanism, a driver, a driven hub, a brake carrier, a brake clutch carried by said brake carrier and cooperative with said hub, a brake fastener adapted to be fastened to the frame of a velocipede and having an opening surrounding said brake carrier, said brake fastener also having a clutch drum also surrounding said brake carrier, and said brake fastener further having a slot through it and opening upon the said opening about said brake carrier and also into the space inclosed by said drum, clutch elements between said drum and said brake carrier, a lag device cooperating with said brake carrier and seated in said slot, and operative connection between said driver and said brake clutch; substantially as described.

32. In a driving and braking mechanism, a driver, a driven hub, a brake carrier, a brake clutch carried by said brake carrier and cooperative with said hub, a brake fastener adapted to be fastened to the frame of a velocipede and having an opening receiving said brake carrier and also having a slot, a clutch between said brake carrier and said brake fastener, a retarder for said brake carrier seated in said slot and lying in said opening about said brake carrier, an abutment, a washer between said abutment and said brake fastener and extending over said opening and said slot, and operative connection between said driver and said brake clutch; substantially as described.

33. In a mechanism of the character indicated, a shaft having a channel thereabout, an abutment member comprising separable blocks received in said channel and having portions extending beyond the periphery of said shaft, said blocks also having portions which do not extend beyond the periphery of said shaft, and a split resilient retaining ring about said last mentioned portions; substantially as described.

34. In a mechanism of the character indicated, a shaft having a channel thereabout, an abutment member comprising separable blocks received in said channel and having portions extending beyond the periphery of said shaft, said blocks also having portions which do not extend beyond the periphery of said shaft and are provided with seats sloping inwardly and toward the center of said shaft, and a split resilient retaining ring about said blocks and in said sloping seats; substantially as described.

35. In a mechanism of the character indicated, a frame, a brake holder, a brake fastener, clutch mechanism between said elements, and means whereby said fastener is held to said frame against rotary movement but is freely adjustable with respect to said frame; substantially as described.

36. In a mechanism of the character indicated, a frame, a brake holder a brake fastener, clutch mechanism between said elements, and a lateral projection upon one of said parts received in an elongated opening of the other thereof; substantially as described.

37. In a mechanism of the character indicated, a frame, a bolt seated in the same, holding means connected to said bolt and upon opposite sides of the frame-material, and a brake fastener in engagement with said bolt; substantially as described.

38. In a mechanism of the character indicated, a frame member, a bolt extending through the same, said bolt having heads upon opposite sides of said frame member, and a brake fastener in engagement with said bolt; substantially as described.

In testimony whereof I hereunto affix my signature.

GEORGE G. BUSH.